(12) United States Patent
Takegami et al.

(10) Patent No.: US 8,099,199 B2
(45) Date of Patent: Jan. 17, 2012

(54) DIGITAL CONTROLLER

(75) Inventors: Eiji Takegami, Tokyo (JP); Kazushi Watanabe, Tokyo (JP); Satoshi Tomioka, Tokyo (JP); Kouji Higuchi, Tokyo (JP); Kazushi Nakano, Tokyo (JP); Tatsuyoshi Kajikawa, Tokyo (JP)

(73) Assignee: TDK-Lameda Corporation, Tokyo (JP)

( * ) Notice: Subject to any disclaimer, the term of this patent is extended or adjusted under 35 U.S.C. 154(b) by 648 days.

(21) Appl. No.: 12/092,111

(22) PCT Filed: Mar. 22, 2007

(86) PCT No.: PCT/JP2007/055906
§ 371 (c)(1),
(2), (4) Date: May 1, 2008

(87) PCT Pub. No.: WO2007/114068
PCT Pub. Date: Oct. 11, 2007

(65) Prior Publication Data
US 2009/0099704 A1    Apr. 16, 2009

(30) Foreign Application Priority Data

Mar. 31, 2006  (JP) .................................. 2006-098471

(51) Int. Cl.
G05D 17/00 (2006.01)
G05B 13/02 (2006.01)
G05B 19/29 (2006.01)
G05B 11/01 (2006.01)

(52) U.S. Cl. ............ 700/298; 700/44; 700/45; 318/600; 318/628

(58) Field of Classification Search .................... 700/28, 700/29, 32, 37, 44, 45, 47; 318/560, 561, 318/563, 600, 628
See application file for complete search history.

(56) References Cited

U.S. PATENT DOCUMENTS

| 5,977,831 A | 11/1999 | Davis et al. |
| 6,255,908 B1 | 7/2001 | Ghannouchi et al. |

FOREIGN PATENT DOCUMENTS

| JP | 08-044438 | 2/1996 |
| JP | 09-034561 | 2/1997 |
| JP | 2005-25328 A | 1/2005 |
| JP | 2005-253284 | 9/2005 |
| JP | 2006-50723 | 2/2006 |
| WO | 2006/013776 | 2/2006 |

OTHER PUBLICATIONS

Higuchi K et al, "Robust digital control of PWM power amplifier by approximate 2-degree-of-freedom system with bumpless mode switching", 42nd IEEE Conference on Decision and Control.(CDC). Maui, HI, Dec. 9, 2003; 20031209-20031212 New York, NY : IEEE, US, vol. 6, pp. 6248-6253, XP010686308.

*Primary Examiner* — Albert Decady
*Assistant Examiner* — Darrin Dunn
(74) *Attorney, Agent, or Firm* — McDermott Will & Emery LLP

(57) ABSTRACT

There is provided a digital controller which can generate no oscillation even if sensing a load side and enables control of supplying a desired voltage to the load. In an power amplifier which supplies an output voltage $v_o$ to the load connected via a load connecting line, a load voltage $v_L$ and the output voltage $v_o$ are periodically sampled to calculate a manipulating variable $\xi_1$ from the output voltage $v_o$, the load voltage $v_L$ and an arbitrary target value r. Based on the manipulating variable $\xi_1$ calculated, a control signal is output to the power amplifier. As a result, when connecting an LC filter with a load device 9 of the power amplifier intended for a control target and besides the load connecting line is long, a robust digital controller without generating oscillation even if sensing the load side is performed can be realized.

21 Claims, 6 Drawing Sheets

DIGITAL CONTROLLER

CROSS-REFERENCE TO PRIOR APPLICATIONS

This is a U.S. national phase application under 35 U.S.C. §371 of International Patent Application No. PCT/JP2007/055906, filed Mar. 22, 2007, and claims the benefit of Japanese Application No. 2006-098471, filed Mar. 31, 2006, both of which are incorporated by reference herein. The International Application was published in Japanese on Oct. 11, 2007 as International Publication No. WO 2007/114068 A1 under PCT Article 21(2).

TECHNICAL FIELD

The present invention relates to a digital controller incorporated in a power amplifier or the like such as a switching regulator to control an output voltage supplied to load, particularly to a digital controller which can meet both a load variation and a power supply voltage fluctuation with a single configuration.

BACKGROUND ART

In a switching regulator as one type of a power amplifier for supplying electric power to a load device, an LC filter is commonly inserted between output terminals of the switching regulator and the load device in order to eliminate noises. When a load connecting line that connects the output terminals of the switching regulator and the load device is long, an equivalent circuitry with the same function as that obtained by inserting the above LC filter is resulted due to floating capacitance and inductance components present in the load connecting line.

FIG. 7 is a circuit diagram representing a circuitry in which an LC circuit is inserted between the output terminals of the switching regulator and the load device. In the figure, a series circuit of switching elements 2, 3 comprising, e.g., MOSFETs are connected across the direct-current power supply 1 with an input voltage vi. By inputting mutually inverted switching pulses from a controller 4 to gates acting as drive terminals of the switching elements 2, 3, the switching elements 2, 3 conduct alternately. A series circuit of a choke coil 5 and a smoothing capacitor 6 is connected with a line between a drain and source of the switching element 3. Both terminals of the smoothing capacitor 6 correspond to output terminals for outputting an output voltage $v_o$. Then, a series circuit of an inductor 7 and capacitor 8 which comprises, e.g., the LC filter and the load connecting line is connected across the smoothing capacitor 6. Both terminals of the capacitor 8 are connected with the load device 9, supplying electric power to the load device 9.

Further, a negative feedback circuit 18 for remotely sensing a load voltage $v_L$ is connected with a load connecting line connecting both the terminals of the capacitor 8 and the load device 9. Hereunder is a description of the negative feedback circuit 18. A series circuit of resistors 10, 11 is connected between the load connecting lines. The load voltage $v_L$ is divided by the resistors 10, 11 and the voltage thus divided is input to an inverting input terminal of an error amplifier 12. A reference voltage of a reference voltage supply 13 is input to a noninverting input terminal of the error amplifier 12. An output terminal of the error amplifier 12 is connected with a cathode of a photo diode 15. An anode of the photo diode 15 is connected, via the resistor 14, with one terminal, a positive side of the load voltage $v_L$, of the capacitor 8. Further, a capacitor 16 is connected between an output terminal and the inverting input terminal of the error amplifier 12. The photo diode 15 pairs with a phototransistor 17 and thus when the photo diode 15 conducts, a signal caused by the conduction is input to the controller 4 via the phototransistor 17. The feedback circuit 18 functions to feedback comparison information between the load voltage $v_L$ and the reference voltage, so that the controller 4 performs the well-known controls such as PWM control and PFM control for a switching pulse input to gates of the switching elements 2, 3.

According to the analogue control described above, there has been a problem that when the LC filter is connected with load of the switching regulator, or the load connecting line is long, sensing of a load side causes output oscillation. FIG. 8 denotes a Bode diagram of the circuit shown in FIG. 7. FIG. 8 shows that a gain at a phase 0 degree is larger than zero and thus oscillation inevitably occurs. As a means for suppressing the oscillation, reducing the whole gain may be considered but degraded response characteristics is unavoidable. If a sensing point is shifted to an output end of an electric power supply, there occurs no oscillation, yet there occurs a voltage drop due to the resistive component of the load connecting line and the inductor, resulting in no desired load voltage $v_L$ being obtained.

As a solution to solve this problem, Patent Document 1 discloses a technique in which a target value of an output terminal voltage is calculated in anticipation of a voltage drop in the load connecting line without setting the sensing point at a load end, whereby feedback control is performed in which an influence of the voltage drop in the load connecting line is taken into account.

Patent document 1: Japanese unexamined patent publication No. 9-34561

DISCLOSURE OF THE INVENTION

Problem to be solved by the Invention

According to the method of the above patent document 1, however, from the result of multiplying a load current value by a load connecting line conducting resistance, a voltage drop due to the load connecting line is estimated to correct a target value of a voltage at a load end. Hence, a high-speed response to a load variation cannot be performed, resulting in instability of an output voltage.

Therefore, in view of the above problem, it is an object of the present invention to provide a digital controller which enables such control as to supply a desired voltage to a load without causing oscillation even if sensing a load side is performed.

Mean for Solving the Problem

According to first to fifth aspects of the present invention, there is provided a digital controller incorporated in an electric power supply which supplies an output voltage $v_o$ to a load connected via a load connecting line, the digital controller being equipped with a manipulating variable calculator built up so as to realize a control system obtained by equivalently converting a formula for calculating manipulating variable $\xi_1$ for the electric power supply with an output voltage $v_o$, a load voltage $v_L$ that is a load end voltage, and an arbitrary target value r of the load voltage $v_L$, defined as input. The manipulating variable calculator is configured to calculate manipulating variable $\xi_1$ according to a formula 1 described below.

Accordingly, when an LC filter is connected with the load of the electric power supply as a control target or a load connecting line is long, a robust digital controller without oscillating even if sensing the load side is performed can be realized.

Further, a sixth aspect of the present invention is a digital controller in which the manipulating variable calculator is schemed to omit parameters too small to largely influence a control system from among parameters used to calculate the manipulating variable $\xi_1$ (xi$_1$).

Furthermore, a seventh aspect of the present invention is a digital controller in which the manipulating variable calculator is schemed so as to dispense with each of feedforward multipliers.

Accordingly, the formula for calculating the manipulating variable $\xi_1$ is simplified to enable arithmetic processing to speed up and a calculator to be simplified.

Effects of the Invention

According to the first to fifth aspects of the present invention, a digital controller can be provided in which even if sensing the load side is performed, there occurs no oscillation to enable a desired voltage to be applied to a load.

Further, according to sixth and seventh aspects of the present invention, high-speed digital control becomes possible. Besides, the configuration of the calculator is simplified, thus enabling a cost to be controlled.

BEST MODE FOR CARRYING OUT THE INVENTION

Hereinafter, a preferred embodiment of a digital controller according to the present invention is described with reference to the appended drawings, in which the same reference symbols are used for parts the same as in a conventional example and common descriptions thereof are omitted for avoiding duplicate descriptions as much as possible.

FIG. 1 is a circuit diagram representing a circuitry of a switching regulator mounted with the digital controller according to the present invention. As is the case with a configuration in FIG. 7 representing the conventional example, a load device 9 is connected via an LC circuit comprising an inductor 7 and a capacitor 8. In FIG. 1, a controller 4 and a feedback circuit 18 in the circuit shown in FIG. 7 is replaced by a robust digital controller 20 comprising, e.g., a DSP (Digital Signal Processor) or the like. In FIG. 1, a series circuit of switching elements 2, 3 comprising, e.g. MOSFETs is connected across a direct-current power source 1 with an input voltage vi. Mutually alternately inverted switching pulses are input to gates acting as driving terminals of the switching elements 2, 3, which conduct alternately as a result. A series circuit of choke coil 5 and smoothing capacitor 6 is connected between a drain and source of the switching element 3. Both terminals of the smoothing capacitor 6 correspond to output terminals outputting the output voltage $v_o$ and a series circuit of the inductor 7 and capacitor 8 which comprise, e.g., an LC filter and a load connecting line is connected across the capacitor 6. Both terminals of the capacitor 8 are connected with the load device 9 to supply electric power to the load device 9. Further, the robust digital controller 20 for remotely sensing the voltage $v_L$ is connected with the load connecting line connecting both the terminals of the capacitor 8 and the load device 9 in order to remotely sense the voltage $v_L$.

The robust digital controller 20 comprises an A/D converter 21 which periodically samples (discretization) analogue signals such as an output voltage $v_o$ and the load voltage $v_L$ to convert the signals sampled into digital signals, the manipulating variable calculator 22 which calculates a manipulating variable $\xi_1$ based on feedback signals made discrete by the A/D converter 21, i.e., the above digital signals and a target value r, and a PWM output unit 23, acting as a control output unit, which produces, in response to the manipulating variable $\xi_1$, switching pulses acting as control signals to output the switching pulses to the gates of the switching elements 2, 3. The robust digital controller 20 according to the present invention detects, with the A/D converter 21, at least two points of the output voltage $v_o$ and load voltage $v_L$ or up to four points if including an output choke coil current iLf and a load inductance current iLL to determine the manipulating variable $\xi_1$ for control. The manipulating variable $\xi_1$ referred to here corresponds to a duty of the switching pulses in the case of, e.g., PWM control. The present invention can be applied to PFM control or the like. When being applied to the PFM control, the manipulating variable $\xi_1$ corresponds to the frequency of the switching pulse. Furthermore, the present invention can be applied to all power supply devices in which the LC filter is connected with load of the power supply device and hence a noise reduction in power supply output can be easily attained.

Next is a description of the manipulating variable calculator 22 that features the robust digital controller 20 with reference to FIG. 2, which is a block diagram representing a fundamental configuration of a control system created by modeling an electric circuit system shown in FIG. 1. In the meantime, the robust digital control system described below is substantially in accordance with the international application PCT/JP2005/013834 filed by present applicant previously under PCT. For details such as the state equations, respective transfer elements or the like which are employed for the control system, the specification etc. of international application may be referred to.

Describing each configuration in the block diagram in FIG. 2, numeral symbol 30 denotes control target elements which satisfy a state equation expressed by the following formula 6, when an input u=$\xi_1$ and a control variable y are each given with respect to a load inductance current iLL corresponding to an output current building up each element of a matrix x and the load voltage $v_L$. Specifically, the control target elements correspond to a converter section of the switching regulator and the LC filter comprising the inductor 7 and the capacitor 8.

$$\dot{x}_d = A_d x_d + B_d u$$

$$y = C_d x_d \qquad \text{[Formula 6]}$$

Depending on the circuitry, appropriate values are determined for each of matrixes Ad, Bd and Cd.

At the same time, parts other than the control target elements 30 correspond to the manipulating variable calculator 22 of the robust digital controller 20 building up an integral type control system. The manipulating variable calculator 22 comprises a combination of each of the transfer elements 31, 33 and 34 acting as a digital filter and an adding point 22 acting as an adder. Then, transfer functions $G_r$, $G_{VO}$ and $G_{VL}$ of each of the transfer elements 31, 33 and 34, respectively are expressed as the following formulae 7.

$$G_{Vo} = \frac{(z - F_{16})F_{12} + F_{14}}{z(z - F_{16}) - F_{15}} \qquad \text{[Formulae 7]}$$

-continued $$G_{VL} = \frac{\frac{1}{z-1}(z-1)[(z-F_{16})F_{112} + F_{132}] - \frac{k_z(z-F_{16})H + k_zH_r}{z(z-F_{16}) - F_{15}}}$$

$$G_r = \frac{1}{z-1}\frac{(z-1)[(z-F_{16})H + H_r] + \frac{k_z(z-F_{16})H + k_zH_r}{z(z-F_{16}) - F_{15}}}$$

where $G_{VO}$ denotes a transfer function from the output voltage $v_o$ to the $\xi_1$, $G_{VL}$ denotes a transfer function from the load voltage $v_L$ to the manipulating variable $\xi_1$, and $G_r$ denotes a transfer function from a target value r of the load voltage to the $\xi_1$, and therefore the manipulating variable $\xi_1$ acting as an output from the adding point 32 can be expressed as the following formula 8.

$$\xi_1 = \frac{1}{z(z-F_{16}) - F_{15}}\{[(z-F_{16}) + \quad \text{[Formula 8]}$$

$$F_{12} + F_{14}]v_o + [(z-F_{16})F_{112} + F_{132}]v_L + $$

$$\frac{k_z}{z-1}[(z-F_{16})H + H_r](r - v_L) + [(z-F_{16})H + H_r]r\}$$

In the above formulae 7, 8, z=exp (jωt) and H, Hr are poles of transfer functions specified between the target value r and the control variable y and further kz, $F_{12}$, $F_{14}$, $F_{15}$, $F_{16}$, $F_{112}$, $F_{132}$ are parameters preset depending on the control system.

Describing more minutely the fundamental configuration shown in FIG. 2, a transfer element 31 with a transfer function $G_r$ is connected with the target value r defined as input, a feedback element 33 with a transfer function $G_{VO}$ is connected with the output voltage $v_o$ defined as input, a feedback element 34 with a transfer function $G_{VL}$ is connected with the output voltage $V_L$ defined as input, an output from the transfer element 31 and an output from each of the feedback elements 33, 34 are added at the adding point 32, and an output produced by the addition at the adding position 32 is applied to a control target element 30 with a calculation delayed output $\xi_1$ inside the robust digital controller 20, defined as input. Thus, the manipulating variable calculator 22 of the robust digital controller 20 is configured. In addition, each of the transfer elements 31, 33 and 34 may be configured as an individual manipulating variable calculator which performs calculation using the transfer functions $G_r$, $G_{VO}$ and $G_{VL}$ for the target value r that has been input, the output voltage $v_o$ and the load voltage $v_L$.

In the above formula, when noting an integrator 1/(z−1) provided in each of the transfer functions $G_{VL}$, $G_r$, the controller configuration shown in FIG. 2 can be also replaced by the configuration shown in FIG. 3. In FIG. 3, the manipulating variable calculator 22 is configured by combining each of the transfer elements 33, 40, 41, 44 acting as a digital filter, an element 83 acting as an integrator with an order of 1/(z−1), the adding point 32 acting as an adder, and an adding point 42 acting as a subtracter. Here, the transfer functions $G_{r2}$, $G_{VL2}$, $G_e$ of each of the transfer elements 40, 41, 44 can be expressed as the following formulae 9, respectively.

$$G_{VL2} = \frac{(z-F_{16})F_{112} + F_{132}}{z(z-F_{16}) - F_{15}} \quad \text{[Formulae 9]}$$

$$G_e = \frac{(z-F_{16})k_zH + k_zH_r}{z(z-F_{16}) - F_{15}}$$

$$G_{r2} = \frac{(z-F_{16})H + H_r}{z(z-F_{16}) - F_{15}}$$

Describing more minutely the configuration shown in FIG. 3, a feedforward element 40 with a transfer function $G_{r2}$ is connected with the target value r defined as input; a feedback element 33 with a transfer function $G_{VO}$ is connected with the output voltage $v_o$ defined as input; a feedback element 41 with a transfer function $G_{VL}$ is connected with the output voltage $v_L$ defined as input; a difference between the target value r and $v_L$ is input from the adding point 42 to an integral element 43 with an order of 1/(z−1), an output from the integral element 43 is input to a transfer element 44 with a transfer function $G_e$, an output from the transfer element 44, an output from the feedforward element 40 and an output from each of feedback elements 33, 41 are added at the adding point 32, and an output produced by the addition at the adding position 32 is applied to the control target element 30 with a calculation delayed output $\xi_1$ inside the robust digital controller 20 defined as input. Thus, the manipulating variable calculator 22 of the robust digital controller 20 is configured.

Further, when noting the structure of each of the transfer functions $G_{VO}$, $G_{r2}$, $G_{VL2}$ in FIG. 3, the following formula 10 can be expressed in a generalized form.

$$G = \frac{(z-F_{16})X + Y}{z(z-F_{16}) - F_{15}} \quad \text{[Formula 10]}$$

With respect to the generalized transfer function G, when an input and an output are defined as u and y, respectively, the following formula 11 can be expressed and when expressing the transfer function G with a block diagram, FIG. 4 can be drawn.

$$y = uG = u\frac{(z-F_{16})X + Y}{z(z-F_{16}) - F_{15}} \quad \text{[Formula 11]}$$

In FIG. 4, transfer elements 50, 51 of parameters X, Y are connected with an input u defined as input, a feedback element 52 with a parameter $F_{15}$ is connected with the output y defined as input, an output from the transfer element 50 and an output from each of feedback elements 52, 54 is added at an adding point 51, an output produced by the addition at the adding point 51 is input to a delay element 53 with an order of 1/z, the delayed output from the delay element 53 is input to the feedback element 54 with a parameter $F_{16}$, an output from the delay element 53 and an output from the transfer element 51 are added at an adding point 55, and further an output produced by the addition at the adding point 55 is input to a delay element 57 with an order of 1/z and then the delayed output from the delay element 57 results in the output y.

Each of the transfer elements 33, 40, 41, 44 shown in FIG. 3 has the same configuration and hence these transfer elements can be built up in the form of FIG. 5 using the configuration shown in FIG. 4. In FIG. 5, the manipulating variable calculator 22 can be configured by combining transfer elements 52, 54, 60 to 67 acting as a multiplier having each of parameters $F_{12}$, $F_{14}$, $F_{15}$, $F_{16}$, $F_{112}$, $F_{132}$, H, Hr, Hkz and Hrkz, delay elements 53, 57 acting as a delay element with an order of 1/z corresponding to one sample delay, an integral element 43 acting as an integrator with an order of 1/(z−1), the adding point 42 acting as a subtracter, and the adding points 51, 55 acting as an adder. In addition, among the parameters H, Hr, Hkz, Hrkz, $F_{12}$, $F_{14}$, $F_{15}$, $F_{16}$, $F_{112}$ and $F_{132}$, those having too small a value to exert an influence on the control system can be omitted and then each of the feedforward elements 60, 61 can be also omitted. As a result, formulae for calculating the manipulating variable $\xi_1$ are simplified to reduce a calculating burden, enabling the arithmetic process to speed up and the calculator to be simplified.

Now the configuration shown in FIG. 5 is more minutely described: each of feedforward elements 60, 61 of the parameters Hr, H, respectively is connected with the target value r defined as input; each of feedback elements 62, 64 with the parameters $F_{12}$, $F_{14}$ is connected with the output voltage $v_o$ defined as input; each of feedback elements 63, 65 with the parameters $F_{112}$, $F_{132}$, respectively is connected with the output voltage $v_L$ defined as input; a difference between the target value r and the output voltage $v_L$ is input from the adding point 42 to an integral element 43 with an order of 1/(z−1), the output from the integral element 43 is input to each of transfer elements 66, 67 with parameters Hkz, Hrkz, and then the output from the transfer element 67, the output from each of the feedback elements 64, 65, the output from each of the feedback elements 52, 54 with parameters $F_{15}$, $F_{16}$ and the output from the feedforward element 60 are added at the adding point 51; the output produced by the addition at the adding point 51 is input to the delay element 53 with an order of 1/z; the delayed output $\xi_2$ from the delay element 53 is input to the feedback element 54 with the parameter $F_{16}$; the delayed output $\xi_2$ from the delay element 53, the output from each of the feedback elements 62, 63, the output from the feedforward element 61, and the output from the transfer element 66 are added at the adding point 55; the output produced by the addition at the adding point 55 is input to the delay element 57 with an order of 1/z; the delayed output $\xi_1$ from the delay element 57 is input to the feedback element 52 with the parameter $F_{15}$ and is applied to the control target element 30. Thus way, the manipulating variable calculator 22 of the robust digital controller 20 is configured.

The switching regulator using the robust digital controller 20 thus obtained generates no oscillation even if sensing the load side is performed when the LC filter is connected with the load of the switching regulator or the load connecting line is long. FIG. 6 denotes a Bode diagram shown in FIG. 1. It can be appreciated that unlike FIG. 8 representing the conventional controller, the gain is smaller than zero when a phase is at zero and thus oscillation is suppressed.

As described above, the robust digital controller 20 according to the present embodiment is a digital controller incorporated in the electric power supply for supplying the output voltage $v_o$ to the load device 9 connected via the load connecting line and besides is equipped with the manipulating variable calculator 22 which calculates the manipulating variable $\xi_1$ for the electric power supply with the output voltage $v_o$, the load voltage $v_L$ that is a voltage across the load, an arbitrary target value r, defined as input.

Further, in the robust digital controller 20 according to the present embodiment, the manipulating variable calculator 22 is equipped with a feedforawrd element 40 corresponding to a first manipulating variable calculator with the target value r defined as input, the feedback element 33 corresponding to a second manipulating variable calculator with the output voltage $v_o$ defined as input, the feedback element 41 corresponding to a third manipulating variable calculator with the load voltage $v_L$ defined as input, the adding point 42 acting as a subtracter which outputs the difference between the target value r and the load voltage $v_L$, the integral element 43 acting as an integrator which integrates a difference output from the adding point 42, and the transfer element 44 corresponding to a fourth manipulating variable calculator with the output from the integral element 43, defined as input. Then, the robust digital controller 20 according to the present embodiment performs an arithmetic operation using the first to fourth manipulating variable calculators to output the manipulating variable $\xi_1$.

Further, in the robust digital controller 20 according to the present embodiment, in accordance with the following formula, $$\xi_1 = \frac{1}{z(z - F_{16}) - F_{15}} \left\{ [(z - F_{16})F_{12} + F_{14}]v_o + [(z - F_{16})F_{112} + F_{132}]v_L + \frac{k_z}{z-1}[(z - F_{16})H + H_r](r - v_L) + [(z - F_{16})H + H_r]r \right\}$$ [Formula 12]

(where z=exp(jωt), H and Hr are poles of the transfer function specified between the target value r and the control variable y, and further kz, $F_{12}$, $F_{14}$, $F_{15}$, $F_{16}$, $F_{112}$, $F_{132}$, are preset given parameters) the manipulating variable calculator is so schemed as to calculate the manipulating variable $\xi_1$.

Furthermore, in the robust digital controller 20 according to the present embodiment, the manipulating variable calculator 22 comprises the following elements and the adding points:

the feedforward element 40 to which the target value r is input and acts as a first digital filter with a transfer function $G_{r2}$ expressed by the formula 13, $$G_{r2} = \frac{(z - F_{16})H + H_r}{z(z - F_{16}) - F_{15}}$$ [Formula 13]

the feedback element 33 to which the output voltage $v_o$ is input and acts as a second digital filter with a transfer function $G_{VO}$ expressed by the formula 14, $$G_{r2} = \frac{(z - F_{16})H + H_r}{z(z - F_{16}) - F_{15}}$$ [Formula 14]

the feedback element 41 to which the load voltage $v_L$ is input and acts as a third digital filter with a transfer function $G_{VL2}$ expressed by the formula 15, $$G_{VL2} = \frac{(z - F_{16})F_{112} + F_{132}}{z(z - F_{16}) - F_{15}}$$ [Formula 15]

the adding point 42 acting as a subtracter which outputs the difference between the target value r and the load voltage $v_L$, the integral element 43 acting as an integrator which integrates the difference output from the adding point 42, and the transfer element 44 to which the output from the integral element 43 is input and acts as a fourth digital filter with a transfer function $G_e$ expressed by the formula 16, $$G_e = \frac{(z - F_{16})k_z H + k_z H_r}{z(z - F_{16}) - F_{15}}$$ [Formula 16]

and further the adding point 32 acting as an adder which adds outputs from the feedforward element 40, the feedback elements 33, 41 and the transfer element 44 to output the manipulating variable $\xi_1$.

Furthermore, in the robust digital controller 20 according to the present embodiment, the manipulating variable calculator 22 is configured as follows: connected is the feedforward elements 60, 61 acting as each of feedforward multipliers which multiply the parameters Hr, H by the target value r defined as input; connected is the feedback elements 62, 64 acting as each of feedback multipliers which multiply the parameters $F_{12}$, $F_{14}$ by the output voltage $v_o$ defined as input; the feedback elements 63, 65 which multiply the parameters $F_{112}$, $F_{132}$ by the load voltage $v_L$ defined as input; the difference between the target value r and the load voltage $v_L$ d is input from the adding point 42 to the integral element 43 acting as an integrator; the output from the integral element 43 is input to the transfer elements 66, 67 each acting as a multiplier which does the multiplication of each of the parameters Hkz, Hrkz, respectively; the output from the transfer element 67 of the parameter Hrkz, the output from the feedback elements 64, 52, 54, 65 each acting as a multiplier which does the multiplication of the parameters $F_{14}$, $F_{15}$ $F_{16}$, $F_{132}$, respectively, and the output from the feedforward element 60 which does the multiplication of the parameter Hr are added at the adding point 51 acting as a first adder 51; the output produced by the addition at the adding point 51 is input to the delay element 53 acting as a delay element for performing delay of one sampling time; the delayed output $\xi_2$ from the delay element 53 is input to the output from the feedback element 54 with the parameters $F_{16}$, the delayed output $\xi_2$ from the delay element 53, the outputs from each of the feedback elements 62, 63 with the parameters $F_{12}$, $F_{112}$, the output from the feedforward element 61 with the parameter H, and the output from the transfer element 66 with the parameter Hkz are added at the adding point 55 acting as a second adder; the output produced by the addition at the adding point 55 is input to the delay element 57 acting as a second delay element for performing delay of one sampling time; and the delayed output $\xi_1$ from the delay element 57 is input to the feedback element 52 with the parameter $F_{15}$.

Consequently, when the LC filter is connected with the load device 9 of the power amplifier intended for the control target and the load connecting line is long, the robust digital controller without oscillating in its output if sensing the load side can be realized. Accordingly, a digital controller can be provided which develops no oscillation even if sensing the load side is performed and can apply a desired voltage to the load device.

Moreover, in the robust digital controller 20 according to the present embodiment, the manipulating variable calculator 22 is so schemed as to omit the parameters which are too small to influence largely the control system from among the parameters H, Hr, kz, $F_{12}$, $F_{14}$ $F_{15}$, $F_{16}$, $F_{112}$, $F_{132}$.

Further, in the robust digital controller 20 according to the present embodiment, the manipulating variable calculator 22 is so schemed as to omit each of the feedfoward elements 60, 61

Hence, a formula for arithmetic operation of the manipulating variable $\xi_1$ is simplified, permitting the high-speed digital control or permitting the costs to be curbed by simplifying the structure of the calculator.

In addition, the present invention is not limited to the above embodiment and various modifications are possible within the scope not departing the gist of the present invention. A wide variety of types of converters such as an insulated type converter using a transformer, a converter with a plurality of switching elements (e.g., a half-bridge converter and a full-bridge converter) or the like is, e.g., applicable for the configuration of the converter, shown in FIG. 1, intended for the control target. Besides, the digital controller according to the present embodiment is applicable to all sorts of devices where a feedback function is applied.

DESCRIPTION OF REFERENCE SYMBOLS

Figure 1:
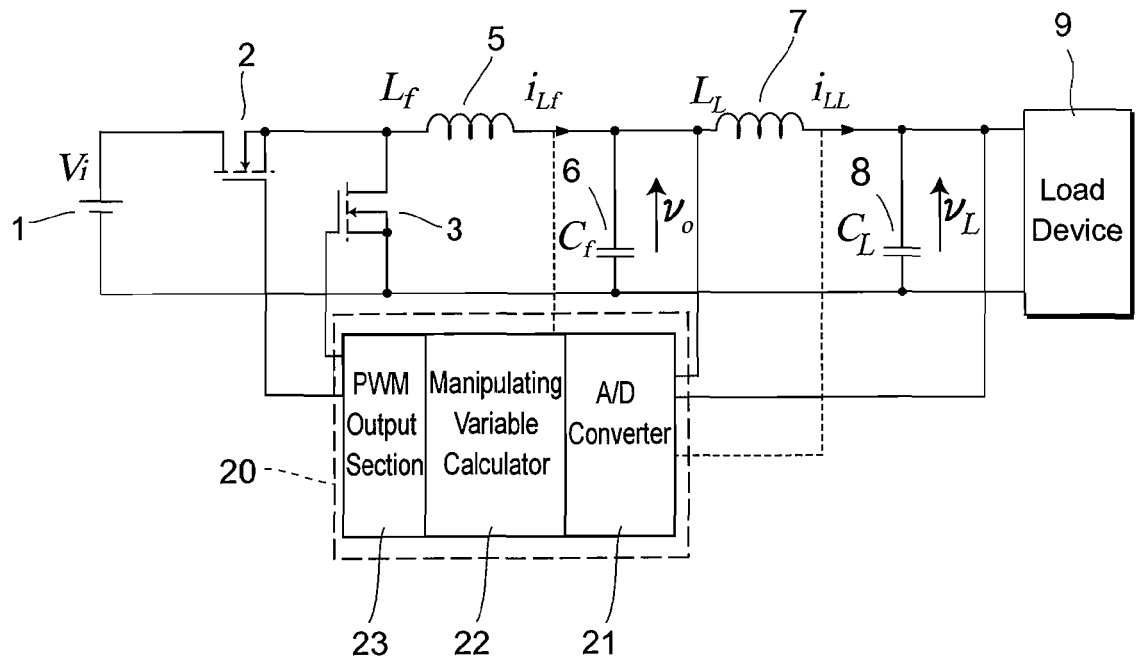
FIG. 1 is a circuit diagram illustrating a configuration of a switching regulator mounted with a digital controller according to the present invention.
Figure 2:
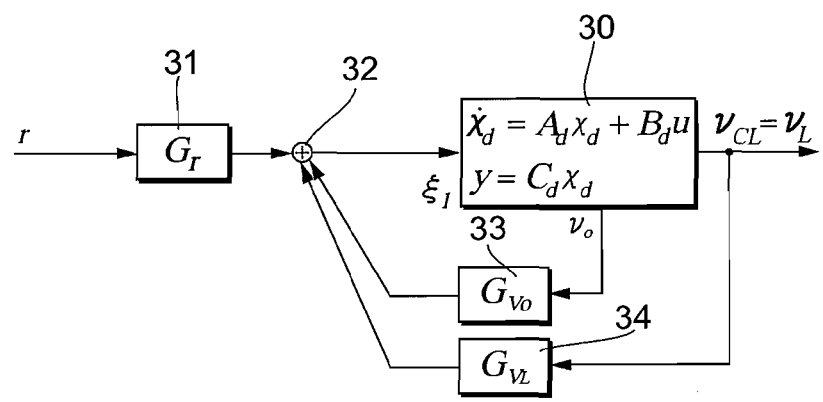
FIG. 2 is a block diagram illustrating a control system of the digital controller according to the present invention.
Figure 3:
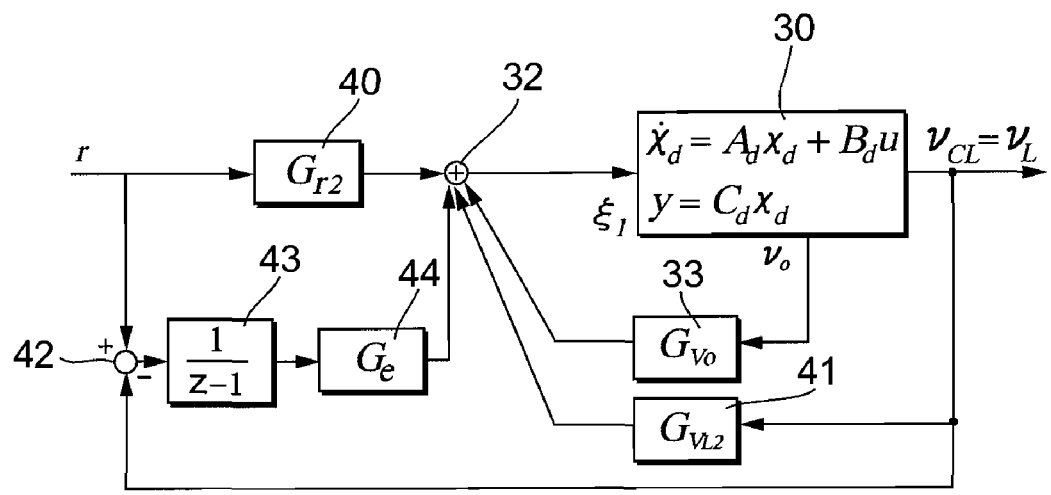
FIG. 3 is a block diagram illustrating a modified example produced by equivalently converting the block diagram in FIG. 2.
Figure 4:
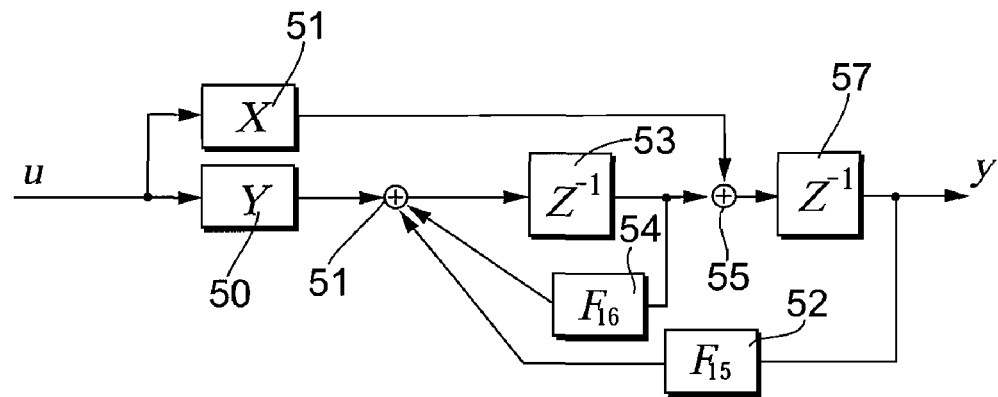
FIG. 4 is a block diagram illustrating a common configuration of transfer functions shown in FIG. 3.
Figure 5:
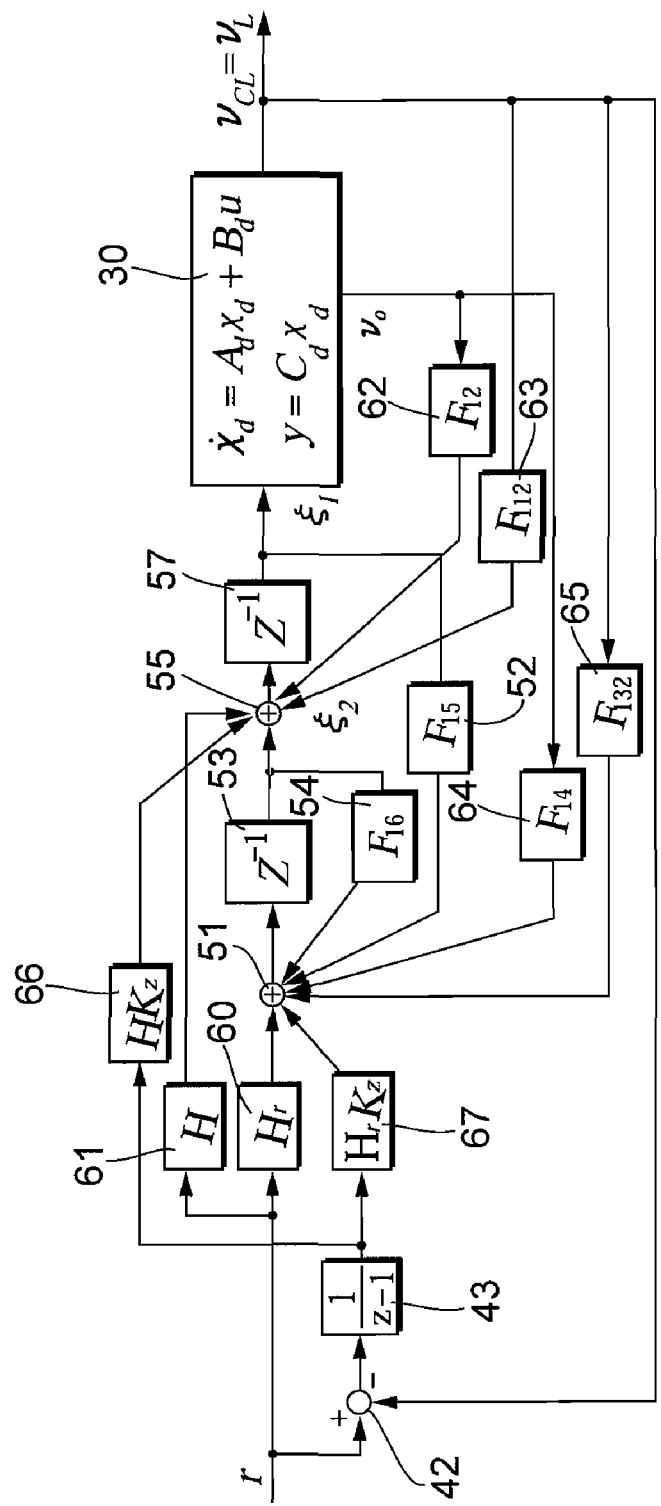
FIG. 5 is a block diagram illustrating a modified example produced by equivalently converting the block diagram in FIG. 3 using the configuration in FIG. 4.
Figure 6A:
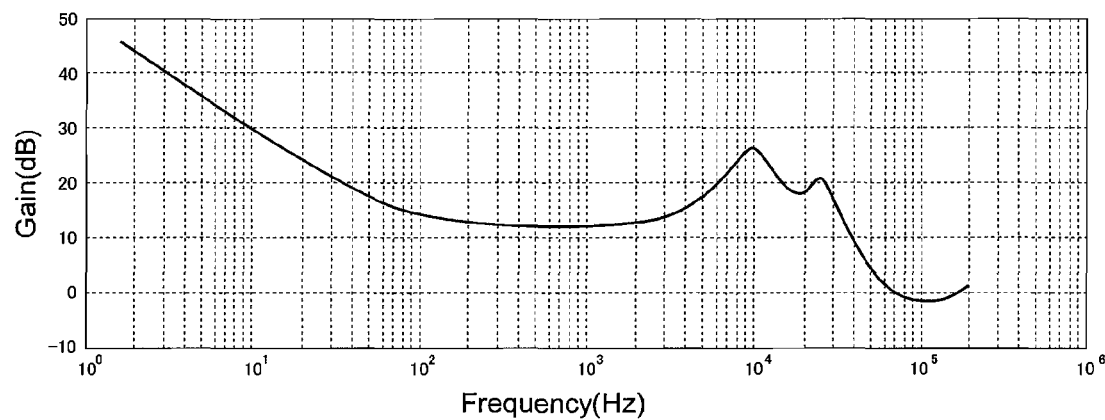
FIG. 6 is a Bode diagram illustrating a frequency characteristic of a switching regulator in FIG. 1.
Figure 6B:
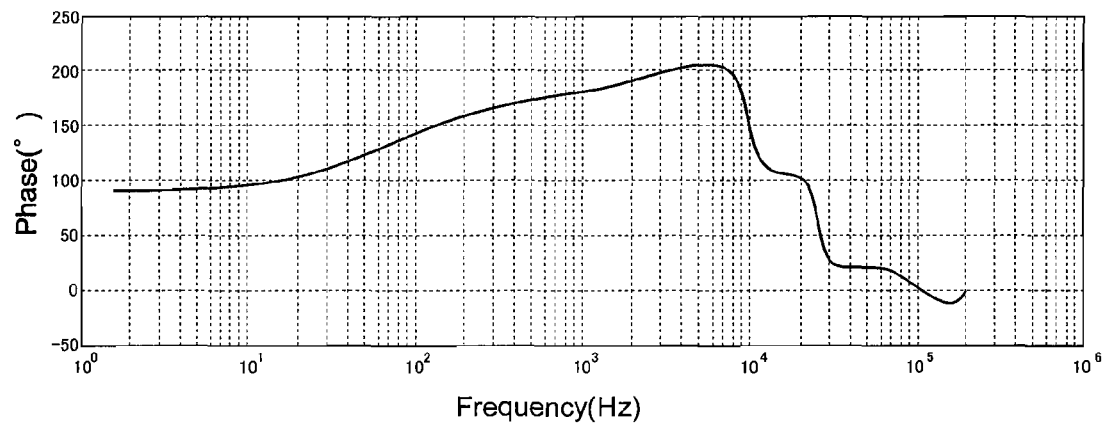
Figure 7:
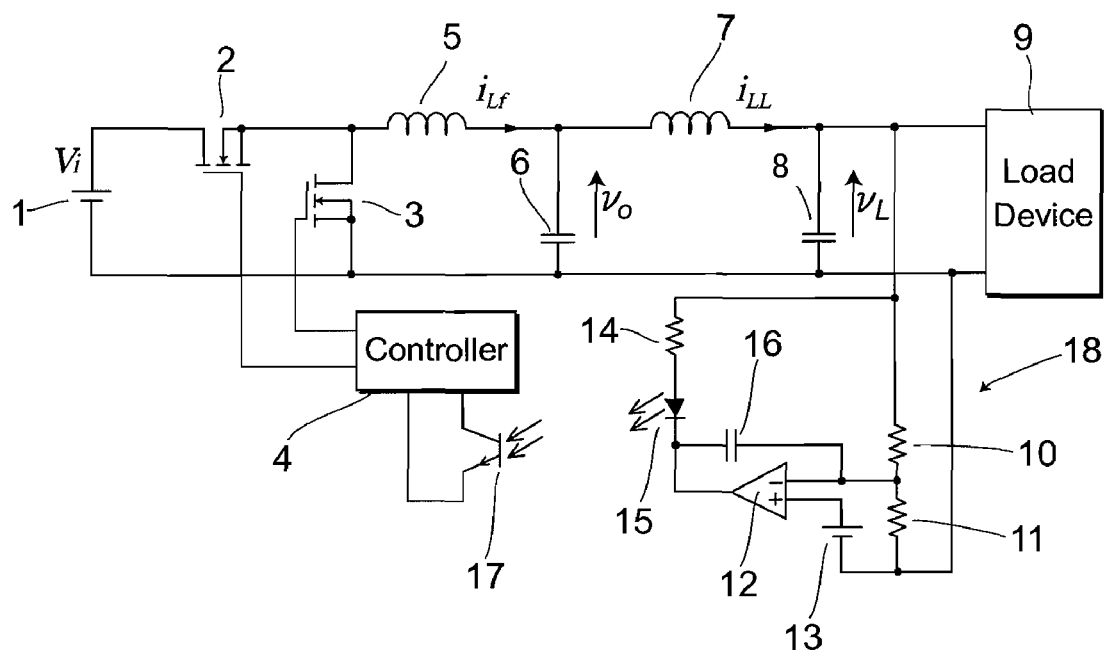
FIG. 7 is a circuit diagram illustrating a configuration of a switching regulator mounted with an analogue controller in a conventional example.
Figure 8A:
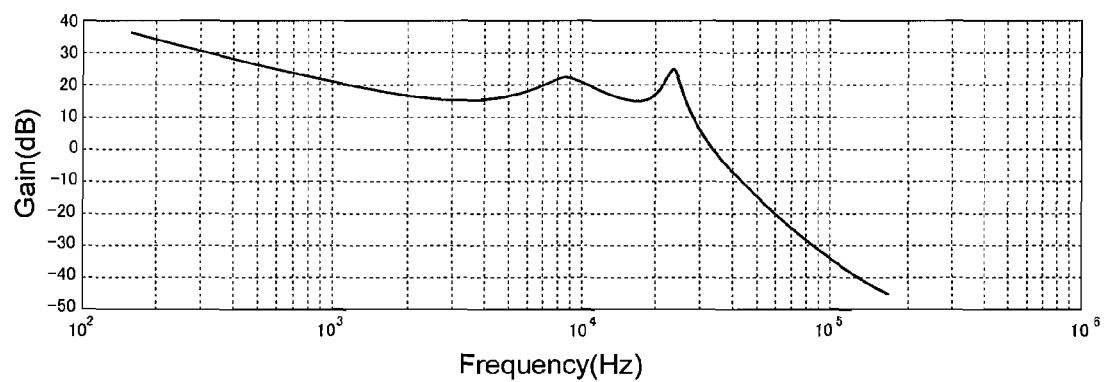
FIG. 8 is a Bode diagram illustrating a frequency characteristic of the switching regulator in FIG. 7.
Figure 8B:
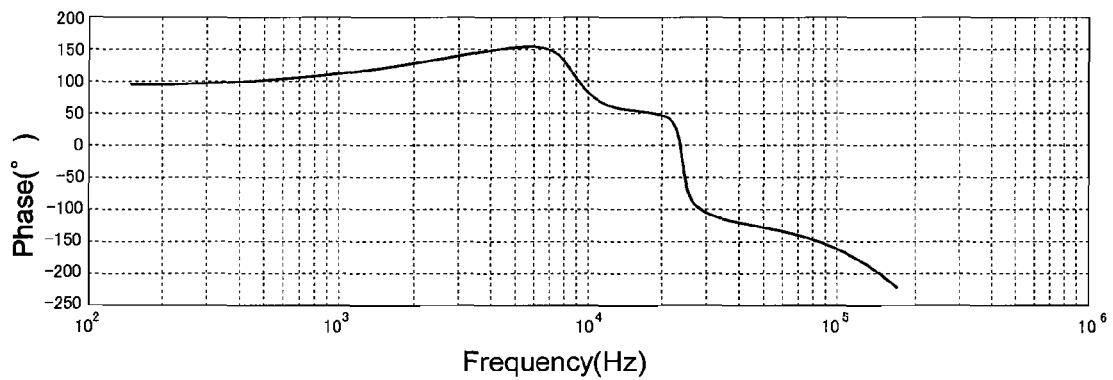

9: load device
20: robust digital controller
22: manipulating variable calculator
32: adding point (adder)
33: feedback element (second manipulating variable calculator, second digital filter)
40: feedforward element (first manipulating variable calculator, first digital filter)
41: feedback element (third manipulating variable calculator, third digital filter)
42: adding point (subtractor)
43: integral element (integrator)
44: transfer element (fourth digital filter)
51: adding point (first adder)
52, 54: feedback element (feedback multiplier)
53: delay element (first delay element)
55: adding point (second adder)
57: delay element (second delay element)
60, 61: feedforward element (feedforward multiplier)
62, to 65: feedback element (feedback multiplier)
66, 67: transfer element (multiplier)

The invention claimed is:

1. A digital controller which supplies an output voltage $v_O$ to a load connected via a load connecting line and is incorporated in an electric power supply wherein said digital controller comprises a manipulating variable calculator to which is configured to be given said output voltage $v_O$, a load voltage $v_L$ that is a voltage across said load and an arbitrary target value r of said load voltage $v_L$ as inputs thereto and is further configured to calculate a manipulating variable $\xi_1$ (xi$_1$) for said electric power supply and according to a following formula 1

$$\xi_1 = \frac{1}{z(z - F_{16}) - F_{15}} \quad \text{[Formula 1]}$$
$$\left\{ [(z - F_{16})F_{12} + F_{14}]v_o + [(z - F_{16})F_{112} + F_{132}]v_L + \frac{k_z}{z-1}[(z - F_{16})H + H_r](r - v_L) + [(z - F_{16})H + H_r]r \right\}$$

(wherein z=exp(jωt), and H, H$_r$ are poles of transfer functions specified between said target value r and a control variable y and kz, $F_{12}$, $F_{14}$, $F_{15}$, $F_{16}$, $F_{16}$, $F_{112}$, $F_{132}$ are preset given parameters) said manipulating variable calculator is configured to calculates said manipulating variable $\xi_1$.

2. The digital controller according to claim 1, said manipulating variable calculator comprising:
a first manipulating variable calculator configured to be given said target value r as an input thereto,
a second manipulating variable calculator configured to be given said output voltage v$_o$ as an input thereto,
a third manipulating variable calculator configured to be given said load voltage v$_L$ as an input thereto,
a subtracter configured to output a difference between said target value r and said load voltage v$_L$,
an integrator configured to integrate said difference output from said subtracter, and
a fourth manipulating variable calculator configured to be given an output from said integrator as an input thereto,
wherein said manipulating variable calculator is configured to perform an arithmetic operation using outputs from said first to fourth manipulating variable calculators, thus being configured to output a manipulating variable $\xi_1$ (xi$_1$).

3. The digital controller according to claim 1, said manipulating variable calculators comprising:
a first digital filter configured to include a transfer function $G_{r2}$ expressed by the following formula 2, said target value r being input to said first digital filter, $$G_{r2} = \frac{(z - F_{16})H + H_r}{z(z - F_{16}) - F_{15}} \quad \text{[Formula 2]}$$

a second digital filter configured to include a transfer function $G_{VO}$ expressed by formula 3, said output voltage v$_o$ being input to said second digital filter, $$G_{Vo} = \frac{(z - F_{16})F_{12} + F_{14}}{z(z - F_{16}) - F_{15}} \quad \text{[Formula 3]}$$

a third digital filter configured to include a transfer function $G_{VL2}$ expressed by formula 4, said load voltage v$_L$ being input to said third digital filter, $$G_{VL2} = \frac{(z - F_{16})F_{112} + F_{132}}{z(z - F_{16}) - F_{15}} \quad \text{[Formula 4]}$$

a subtracter configured to output said difference between said target value r and said load voltage v$_L$,
an integrator configured to integrate said difference output from said subtracter,
a fourth digital filter configured to include a transfer function $G_e$ expressed by formula 5, an output from said integrator is input to said fourth digital filter, $$G_e = \frac{(z - F_{16})k_z H + k_z H_r}{z(z - F_{16}) - F_{15}} \quad \text{[Formula 5]}$$

and an adder configured to output from said first to fourth digital filters, outputting said manipulating variable $\xi_1$.

4. The digital controller according to claim 1, said manipulating variable calculator comprising:
each of feedforward multipliers configured to multiply parameters Hr, H by said target value r that is defined as input,
each of feedback multipliers configured to multiply said parameters $F_{12}$, $F_{14}$ by the output voltage v$_o$ that is defined as input, and
each of feedback multipliers configured to multiply the parameters $F_{112}$, $F_{132}$ by the load voltage v$_L$ that is defined as input, wherein
a difference between said target value r and said load voltage V$_L$ is input from a subtracter to an integrator,
an output from said integrator is input to each of said multipliers configured to do multiplication of said parameters Hkz, Hrkz,
an output from said multiplier configured to include said parameter Hrkz, an output from each of said feedback multipliers configured to do multiplication of said parameters $F_{14}$, $F_{15}$ $F_{16}$, $F_{132}$, and an output from said feedforward multiplier configured to do multiplication of said parameter Hr are added by a first adder,
an output produced from said addition by said first adder is input to a first delay element configured to perform delay of one sampling time,
a delayed output $\xi_2$ (xi$_2$) from said first delay element is input to said feedback multiplier configured to include said parameter $F_{16}$,
said delayed output $\xi_2$ (xi$_2$) from said first delay element, an output from each of said feedback multipliers configured to include said parameters $F_{12}$, $F_{112}$, an output from said feedforward multiplier configured to include said parameter H, and an output from said multiplier configured to include said parameter Hkz are added by a second adder,
an output produced by said addition by said second adder is input to a second delay element configured to perform delay of one sampling time,
a delayed output $\xi_1$ (xi$_1$) from said second delay element is input to said feedback multiplier configured to include said parameter $F_{15}$ and then is output as a manipulating variable $\xi_1$ (xi$_1$).

5. The digital controller according to claim 1, wherein said manipulating variable calculator is configured by omitting parameters which are too small to influence largely the control system from among said parameters H, Hr, kz, $F_{12}$, $F_{14}$ $F_{15}$, $F_{16}$, $F_{112}$, and $F_{132}$.

6. The digital controller according to claim 4, wherein said manipulating variable calculator is configured so as to be dispensed with each of said feedforward multipliers.

7. The digital controller according to claim 2, said manipulating variable calculators comprising:

a first digital filter configured to include a transfer function $G_{r2}$ expressed by the following formula 2, said target value r being input to said first digital filter, $$G_{r2} = \frac{(z - F_{16})H + H_r}{z(z - F_{16}) - F_{15}} \quad \text{[Formula 2]}$$

a second digital filter configured to include a transfer function $G_{Vo}$ expressed by formula 3, said output voltage $v_o$ being input to said second digital filter, $$G_{Vo} = \frac{(z - F_{16})F_{12} + F_{14}}{z(z - F_{16}) - F_{15}} \quad \text{[Formula 3]}$$

a third digital filter configured to include a transfer function $G_{VL2}$ expressed by formula 4, said load voltage $v_L$ being input to said third digital filter, $$G_{VL2} = \frac{(z - F_{16})F_{112} + F_{132}}{z(z - F_{16}) - F_{15}} \quad \text{[Formula 4]}$$

a subtracter configured to outputs said difference between said target value r and said load voltage $v_L$,
an integrator configured to integrate said difference output from said subtracter,
a fourth digital filter configured to include a transfer function $G_e$ expressed by formula 5, an output from said integrator is input to said fourth digital filter, $$G_e = \frac{(z - F_{16})k_z H + k_z H_r}{z(z - F_{16}) - F_{15}} \quad \text{[Formula 5]}$$

and an adder configured to output from said first to fourth digital filters, outputting said manipulating variable $\xi_1$.

8. The digital controller according to claim 2, said manipulating variable calculator comprising:
each of feedforward multipliers configured to multiply parameters Hr, H by said target value r that is defined as input,
each of feedback multipliers configured to multiply said parameters $F_{12}$, $F_{14}$ by the output voltage $v_o$ that is defined as input, and
each of feedback multipliers configured to multiply the parameters $F_{112}$, $F_{132}$ by the load voltage $v_L$ that is defined as input, wherein
a difference between said target value r and said load voltage $v_L$ is input from a subtracter to an integrator,
an output from said integrator is input to each of said multipliers configured to do multiplication of said parameters Hkz, Hrkz,
an output from said multiplier configured to include said parameter Hrkz, an output from each of said feedback multipliers configured to do multiplication of said parameters $F_{14}$, $F_{15}$ $F_{16}$, $F_{132}$, and an output from said feedforward multiplier configured to do multiplication of said parameter Hr are added by a first adder,
an output produced from said addition by said first adder is input to a first delay element configured to perform delay of one sampling time, a delayed output $\xi_2$ ($xi_2$) from said first delay element is input to said feedback multiplier configured to include said parameter $F_{16}$,
said delayed output $\xi_2$ ($xi_2$) from said first delay element, an output from each of said feedback multipliers configured to include said parameters $F_{12}$, $F_{112}$, an output from said feedforward multiplier configured to include said parameter H, and an output from said multiplier configured to include said parameter Hkz are added by a second adder,
an output produced by said addition by said second adder is input to a second delay element configured to perform delay of one sampling time, and
a delayed output $\xi_1$ ($xi_1$) from said second delay element is input to said feedback multiplier configured to include said parameter $F_{15}$ and then is output as a manipulating variable $\xi_1$ ($xi_1$).

9. The digital controller according to claim 2, wherein said manipulating variable calculator is configured by omitting parameters which are too small to influence largely the control system from among said parameters H, Hr, kz, $F_{12}$, $F_{14}$ $F_{15}$, $F_{16}$, $F_{112}$, and $F_{132}$.

10. The digital controller according to claim 3, wherein said manipulating variable calculator is configured by omitting parameters which are too small to influence largely the control system from among said parameters H, Hr, kz, $F_{12}$, $F_{14}$ $F_{15}$, $F_{16}$, $F_{112}$, and $F_{132}$.

11. The digital controller according to claim 7, wherein said manipulating variable calculator is configured by omitting parameters which are too small to influence largely the control system from among said parameters H, Hr, kz, $F_{12}$, $F_{14}$ $F_{15}$, $F_{16}$, $F_{112}$, and $F_{132}$.

12. The digital controller according to claim 4, wherein said manipulating variable calculator is configured by omitting parameters which are too small to influence largely the control system from among said parameters H, Hr, kz, $F_{12}$, $F_{14}$ $F_{15}$, $F_{16}$, $F_{112}$, and $F_{132}$.

13. The digital controller according to claim 8, wherein said manipulating variable calculator is configured by omitting parameters which are too small to influence largely the control system from among said parameters H, Hr, kz, $F_{12}$, $F_{14}$ $F_{15}$, $F_{16}$, $F_{112}$, and $F_{132}$.

14. The digital controller according to claim 4, wherein said manipulating variable calculator is configured so as to be dispensed with each of said feedforward multipliers.

15. The digital controller according to claim 8, wherein said manipulating variable calculator is configured so as to be dispensed with each of said feedforward multipliers.

16. The digital controller according to claim 5, wherein said manipulating variable calculator is configured so as to be dispensed with each of said feedforward multipliers.

17. The digital controller according to claim 9, wherein said manipulating variable calculator is configured so as to be dispensed with each of said feedforward multipliers.

18. The digital controller according to claim 10, wherein said manipulating variable calculator is configured so as to be dispensed with each of said feedforward multipliers.

19. The digital controller according to claim 11, wherein said manipulating variable calculator is configured so as to be dispensed with each of said feedforward multipliers.

20. The digital controller according to claim 12, wherein said manipulating variable calculator is configured so as to be dispensed with each of said feedforward multipliers.

21. The digital controller according to claim 13, wherein said manipulating variable calculator is configured so as to be dispensed with each of said feedforward multipliers.

* * * * *

UNITED STATES PATENT AND TRADEMARK OFFICE
CERTIFICATE OF CORRECTION

PATENT NO. : 8,099,199 B2
APPLICATION NO. : 12/092111
DATED : January 17, 2012
INVENTOR(S) : Eiji Takegami et al.

It is certified that error appears in the above-identified patent and that said Letters Patent is hereby corrected as shown below:

Title Page
In Item (73), the Assignee is listed incorrectly: It currently reads TDK-Lameda Corporation, Tokyo (JP), but should read TDK-LAMBDA CORPORATION, Tokyo (JP).

Signed and Sealed this
Twentieth Day of March, 2012

David J. Kappos
*Director of the United States Patent and Trademark Office*